J. DOTTL.
SPRING AND FRAME SUPPORTER FOR MOTOR CARS.
APPLICATION FILED NOV. 20, 1915.
1,205,603.
Patented Nov. 21, 1916.
2 SHEETS—SHEET 1.
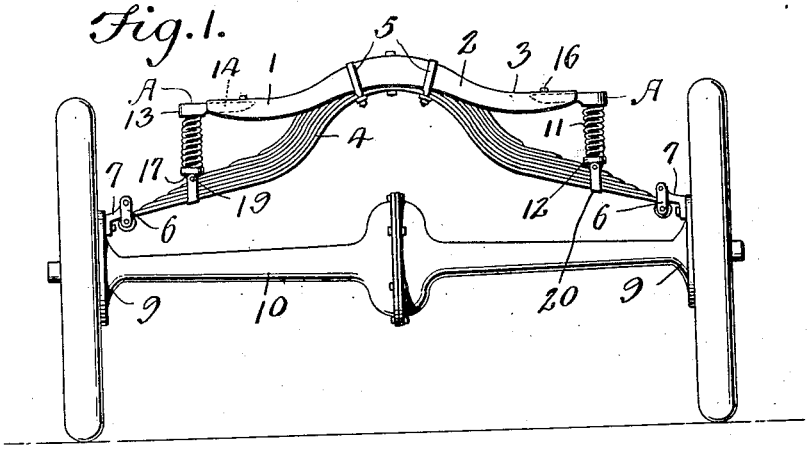
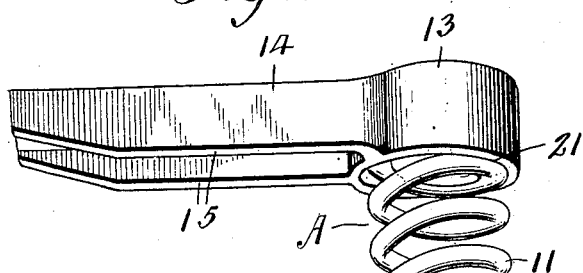
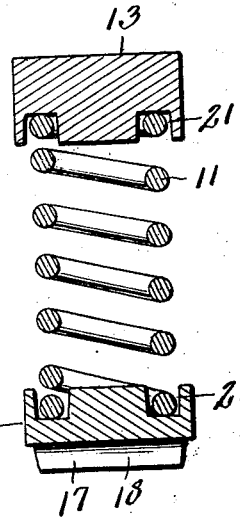
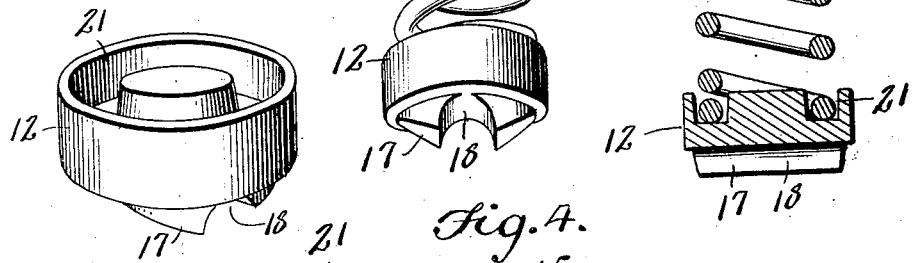
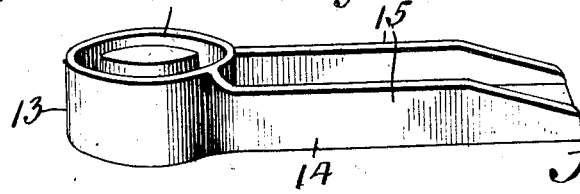
Inventor
J. Dottl,
Witnesses
By Victor J. Evans
Attorney J. DOTTL.
SPRING AND FRAME SUPPORTER FOR MOTOR CARS.
APPLICATION FILED NOV. 20, 1915.
1,205,603.
Patented Nov. 21, 1916.
2 SHEETS—SHEET 2.
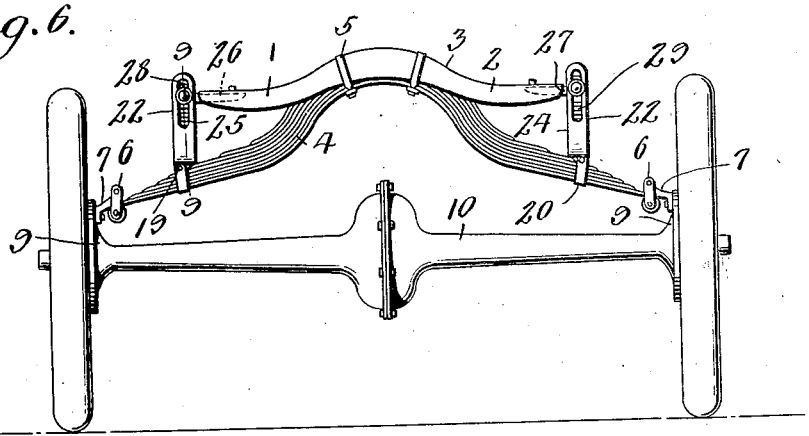
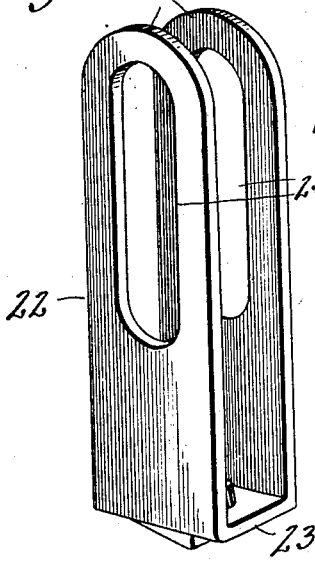
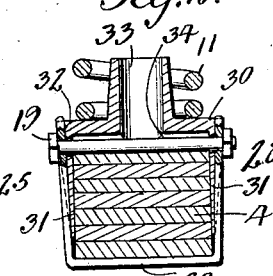
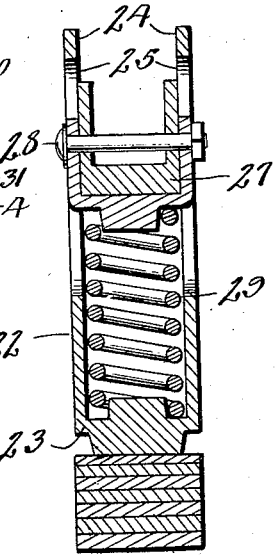
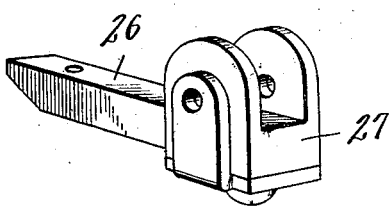
Inventor
J. Dottl,
By Victor J. Evans
Attorney
Witnesses

UNITED STATES PATENT OFFICE.

JOSEPH DOTTL, OF MADISON, WISCONSIN.

SPRING AND FRAME SUPPORTER FOR MOTOR-CARS.

1,205,603.     Specification of Letters Patent.     Patented Nov. 21, 1916.

Application filed November 20, 1915. Serial No. 62,601.

*To all whom it may concern:*

Be it known, that I, JOSEPH DOTTL, a citizen of the United States, residing at Madison, in the county of Dane and State of Wisconsin, have invented new and useful Improvements in Spring and Frame Supporters for Motor-Cars, of which the following is a specification.

This invention relates to auxiliary springs for vehicles, being especially designed as a reinforcing support for the main body supporting spring or springs of a vehicle and being applicable to certain types of vehicles already in use, the device being adapted to be readily applied to vehicles and requiring no material change in the structure of the vehicle itself.

The object of the present invention is to support the weak points of a main vehicle spring so as to materially increase the carrying capacity and strength of the entire spring, preventing the frame of the vehicle from bending downwardly and shearing off the center bolt and also from shifting sidewise. The device enables the load of the vehicle to be practically doubled, prevents the main spring or springs from riding or resting on the axle housing, prevents the loaded body from swaying laterally, maintaining the same in a substantially upright position and also avoiding the objectionable tipping up of the front end of the body. Incidentally the device relieves the tires and the entire car by preventing lateral or side-swinging motion of the body especially when turning corners and traveling over rough roads. The device enables the chassis of a pleasure car to be converted into a truck for carrying a load much greater than the springs were originally designed for.

With the above and other objects in view, the invention consists in the novel construction, combination and arrangement of parts, as herein described, illustrated and claimed.

In the accompanying drawings, Figure 1 is a rear elevation of sufficient part of an automobile to illustrate the application of the present invention thereto, the auxiliary spring being shown in the preferred form thereof. Fig. 2 is an enlarged perspective view of one of the auxiliary body supporting units. Fig. 3 is a detail perspective view of the bottom spring holder or cap. Fig. 4 is a similar view of the upper cap with the bolster extension arm. Fig. 5 is a vertical section through the top and bottom spring-holding caps, showing the relation of the ends of the spring thereto. Fig. 6 is a rear elevation similar to Fig. 1 showing another form of auxiliary body-supporting unit. Fig. 7 is a detail perspective view of the support for the lower end of the auxiliary spring. Fig. 8 is a similar view of the upper spring-holding cap with its arm forming the bolster extension. Fig. 9 is a section on the line 9—9 of Fig. 6. Fig. 10 is a fragmentary vertical section showing means for fastening the bottom holder or cap to the spring. Fig. 11 is a detail perspective view of the holder or cap shown in Fig. 10.

Referring to the drawings 1 designates a vehicle body bolster which extends transversely of the body and is usually formed of channel iron, being provided with the longitudinal flanges 2 which extend downwardly from the top plate or main body 3 of the bolster.

4 designates one of the main body-supporting springs which is shown as of the multiple leaf type and centrally arched and fitted between the flanges 2 of the bolster to which it is secured by means of clips 5. The extremities of the spring 4 are usually connected by swinging shackles 6 to arms 7 fastened to the expanded end portions 9 of the rear axle housing 10.

All of the parts hereinabove described are of the ordinary construction and arrangement.

In carrying out the present invention in the simpler form thereof, I employ a pair of auxiliary body supporting units designated at A, A. Each body-supporting unit comprises a coiled expansion spring 11, a holder or cap 12 for the bottom end of the spring 11 and a top cap or holder 13 for the spring 11, said cap 13 being formed with an arm 14 preferably formed integrally with the holder or cap 13 and extending substantially at a right angle to the axis of the spring 11 as clearly indicated in the drawings. The arm 14 is preferably channeled on its under side to provide the downwardly extending longitudinal flanges 15 while the top wall of the arm 14 is provided with a bolt hole to receive a bolt 16 by means of which the arm 14 is securely fastened to the adjacent end of the bolster 1, the flanges 15 being arranged so as to enable them to be introduced between the flanges 2 of the bolster 1 and thus rendering it unnecessary to use more than a single bolt 16 to secure the arm of the bolster. The arm 14 thus constitutes an extension of one end of the bolster 1.

The bottom support or holder 12 is provided on its under side with a lug 17 having a convex lower face and centrally formed with a groove 18 designed to fit over and upon the bolt 19 of a clip 20 which embraces and holds together the leaves of the main body supporting spring 4. Owing to the fact that the spring 11 is always partly compressed, it is not ordinarily necessary to additionally fasten the supporting holder 12 to the clip 20 or the spring 4. The holders or caps 12 and 13 are provided in their adjacent faces with annular grooves or seats 21 for the terminal convolutions of the coiled expansion spring 11 thus preventing the spring from flying out of place.

In another embodiment of the invention as shown in Figs. 6 to 9 inclusive, the holder 22 for the bottom end of the spring 11 is shown as composed of a metal strap which is bent to form a bottom connecting portion 23 and parallel upwardly extending arms 24 which are formed with slots 25 extending lengthwise thereof and substantially in a vertical direction when the unit is in place. The upper spring holder or cap 26 is provided with the arm 27 corresponding with the bolster extension arm 14 of the preceding figures of the drawings and a guiding member 28 shown in the form of a pin or bolt is inserted through the cap 26 and works longitudinally of the slots 25 under the action of the spring 24 and the weight imposed thereon. The arm 27 of the upper cap or holder is fastened to the bolster 1 in the same manner as hereinabove described and the bottom of the unit rests upon and is held in place by the bolt 19 of the spring clip 20 as indicated in Fig. 6.

From the foregoing description taken in connection with the accompanying drawings it will now be understood that the auxiliary body supporting units are practically interposed between the extremities of the body supporting bolster and the adjacent main body supporting spring of the vehicle. All of the load is therefore not imposed on the center of the spring but a substantial portion of the load is also supported by the spring at the points where the auxiliary units are employed. This not only distributes the load along the main body supporting spring but prevents lateral tilting of the body and therefore the tendency of the machine and the load to sway laterally, especially in making short turns and in traveling over rough roads. A much greater load may be carried by the vehicle on account of the auxiliary body-supporting units and the latter may be quickly and easily associated with the vehicle by merely jacking up the bolster 1 and thereby relieving the weight on the spring 4 so that the auxiliary body-supporting units may be placed in their useful positions.

In Figs. 10 and 11 the bottom holder or cap 30 is shown as provided with downwardly extending arms 31 which embrace the spring 4, the arms 31 being channeled at 32 to receive the arms of the clip 20 which embraces the vehicle spring. Said cap or holder 30 is provided with the upstanding boss 33 to receive and hold in place the bottom portion of the spring 11. The arms 31 are provided with holes in line with the holes of the clip 20 to receive the clip retaining bolt. The arms 31 are also preferably tapered or made of gradually decreasing thickness toward their lower extremities so as to wedge themselves firmly between the opposite faces of the spring 4 and the inner faces of the upwardly extending side portions of the clip 20.

Having thus described my invention, I claim:—

The combination with a vehicle frame, a bolster extending transversely thereof and having parallel longitudinal flanges extending downwardly therefrom, and an arched body-supporting main spring centrally secured to the bolster and terminally connected with the axle housing, of auxiliary body-supporting units interposed between the bolster ends and said spring, each unit comprising a coiled expansion spring, a holder for the bottom end of said expansion spring supported upon the main spring, and a bolster extension arm fastened to the underside of the bolster between the flanges thereof and embodying a spring holding cap which fits over the upper end of said expansion spring.

In testimony whereof I affix my signature in presence of two witnesses.

JOSEPH DOTTL.

Witnesses:
CLARA QUINN,
J. J. McMANAMY.